US009077844B2

(12) United States Patent
Yu et al.

(10) Patent No.: US 9,077,844 B2
(45) Date of Patent: Jul. 7, 2015

(54) MULTI-SCREEN VIDEO PLAYBACK SYSTEM AND RELATED COMPUTER PROGRAM PRODUCT

(71) Applicant: Realtek Semiconductor Corp., Hsinchu (TW)

(72) Inventors: Siu-Leong Yu, Zhubei (TW); Shih-Chun Wei, Hsinchu (TW); Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 173 days.

(21) Appl. No.: 13/858,551

(22) Filed: Apr. 8, 2013

(65) Prior Publication Data
US 2013/0265488 A1    Oct. 10, 2013

Related U.S. Application Data

(60) Provisional application No. 61/620,988, filed on Apr. 6, 2012, provisional application No. 61/727,745, filed on Nov. 18, 2012.

(30) Foreign Application Priority Data

Feb. 8, 2013  (TW) .............................. 102105440 A

(51) Int. Cl.
*G09G 5/00* (2006.01)
*H04N 9/12* (2006.01)
*H04N 21/218* (2011.01)
*H04N 21/242* (2011.01)
*H04N 21/414* (2011.01)
*H04N 21/43* (2011.01)
*H04N 21/81* (2011.01)
*G06F 3/14* (2006.01)

(52) U.S. Cl.
CPC ............ *H04N 9/12* (2013.01); *H04N 21/21805* (2013.01); *H04N 21/242* (2013.01); *H04N 21/41407* (2013.01); *H04N 21/4307* (2013.01); *H04N 21/816* (2013.01); *G06F 3/1438* (2013.01)

(58) Field of Classification Search
CPC . H04N 9/12; H04N 21/21805; H04N 21/242; H04N 21/4307; H04N 21/816; H04N 21/41407; G06F 3/1438
USPC ......................................................... 345/1.3
See application file for complete search history.

(56) References Cited

U.S. PATENT DOCUMENTS

| 7,884,855 | B2 |   | 2/2011  | Ortiz             |         |
|-----------|----|---|---------|-------------------|---------|
| 8,619,094 | B2 | * | 12/2013 | Genova et al.     | 345/611 |
| 2007/0052615 | A1 | * | 3/2007 | Van Dongen et al. | 345/1.1 |
| 2009/0278763 | A1 | * | 11/2009 | Zeng et al.      | 345/1.1 |
| 2013/0040623 | A1 | * | 2/2013  | Chun et al.       | 455/414.2 |

FOREIGN PATENT DOCUMENTS

TW            591400         6/2004

* cited by examiner

*Primary Examiner* — Charles V Hicks
(74) *Attorney, Agent, or Firm* — Birch, Stewart, Kolasch & Birch, LLP

(57) ABSTRACT

A multi-screen video playback system includes: a video playback device having a main display to playback a target video; a portable communication device having a screen; and a multi-screen display controlling server configured to operably establish a device group relationship between the video playback device and the portable communication device, to transmit the target video to the video playback device via a network, and to transmit an auxiliary video to the portable communication device via the network. The multi-screen display controlling server receives a notice information generated by the video playback device while the video playback device playbacks the target video, and instructs the portable communication device to begin displaying the auxiliary video on the screen according to the notice information.

18 Claims, 6 Drawing Sheets

MULTI-SCREEN VIDEO PLAYBACK SYSTEM AND RELATED COMPUTER PROGRAM PRODUCT

CROSS-REFERENCE TO RELATED APPLICATIONS

This application claims the benefit of priority to U.S. Provisional Application Ser. No. 61/620,988, filed on Apr. 6, 2012; the entirety of which is incorporated herein by reference for all purposes.

This application claims the benefit of priority to U.S. Provisional Application Ser. No. 61/727,745, filed on Nov. 18, 2012; the entirety of which is incorporated herein by reference for all purposes.

This application claims the benefit of priority to Patent Application No. 102105440, filed in Taiwan on Feb. 8, 2013; the entirety of which is incorporated herein by reference for all purposes.

BACKGROUND

The disclosure generally relates to a video playback system and, more particularly, to a multi-screen video playback system and related computer program products.

In general, when making movies or TV programs, the movie producer or TV producer typically employs multiple cameras to capture images from different viewing angles. However, traditional video playback systems are single-screen systems. No matter the audiences choose to watch movies in the movie theaters or choose to watch videos or TV programs at home by using a home theater system, they can only watch the video or TV programs through the pre-installed single screen.

Therefore, in order to simultaneously display images of different viewing angles in the traditional video playback systems, the movie producer or TV producer may display the images of different viewing angles on the same screen by adopting a split-screen approach or display the images of different viewing angles in turns, i.e., display the images of different viewing angles one after another. Apparently, it is difficult for the movie producer or TV producer to create more diversified approaches for presenting video in view of the limited number of screen in the existing video playback system, and it is thus difficult for the movie industry to provide the audiences with more rich and more different experience in watching videos.

SUMMARY

An example embodiment of a multi-screen video playback system is disclosed, comprising: a video playback device, comprising a main display configured to operably display a target video; a portable communication device, comprising a screen; and a multi-screen display controlling server, configured to operably establish a device group relationship between the video playback device and the portable communication device, to operably transmit the target video to the video playback device via a network, and to operably transmit an auxiliary video to the portable communication device via a network; wherein the multi-screen display controlling server receives a notice information generated by the video playback device while the video playback device playbacks the target video, and instructs the portable communication device to begin displaying the auxiliary video on the screen according to the notice information.

An example embodiment of a computer program product is disclosed. The computer program product is stored in a non-transitory storage device of a multi-screen display controlling server. When the computer program product is executed by a control circuit of the multi-screen display controlling server, the computer program product enables the multi-screen display controlling server to perform a multi-screen display controlling operation. The computer program product comprises: a group setting module, configured to operably establish a device group relationship between a video playback device and a portable communication device, wherein the video playback device comprises a main display, and the portable communication device comprises a screen; a target video providing module, configured to operably transmit a target video to the video playback device via a network, so that the video playback device displays the target video on the main display; an auxiliary video providing module, configured to operably transmit an auxiliary video to the portable communication device via a network; a receiving module, configured to operably receive a notice information generated by the video playback device while the video playback device playbacks the target video; and an instruction module, configured to operably instruct the portable communication device to begin displaying the auxiliary video on the screen according to the notice information.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or similar parts, components, or operations.

Figure 1:
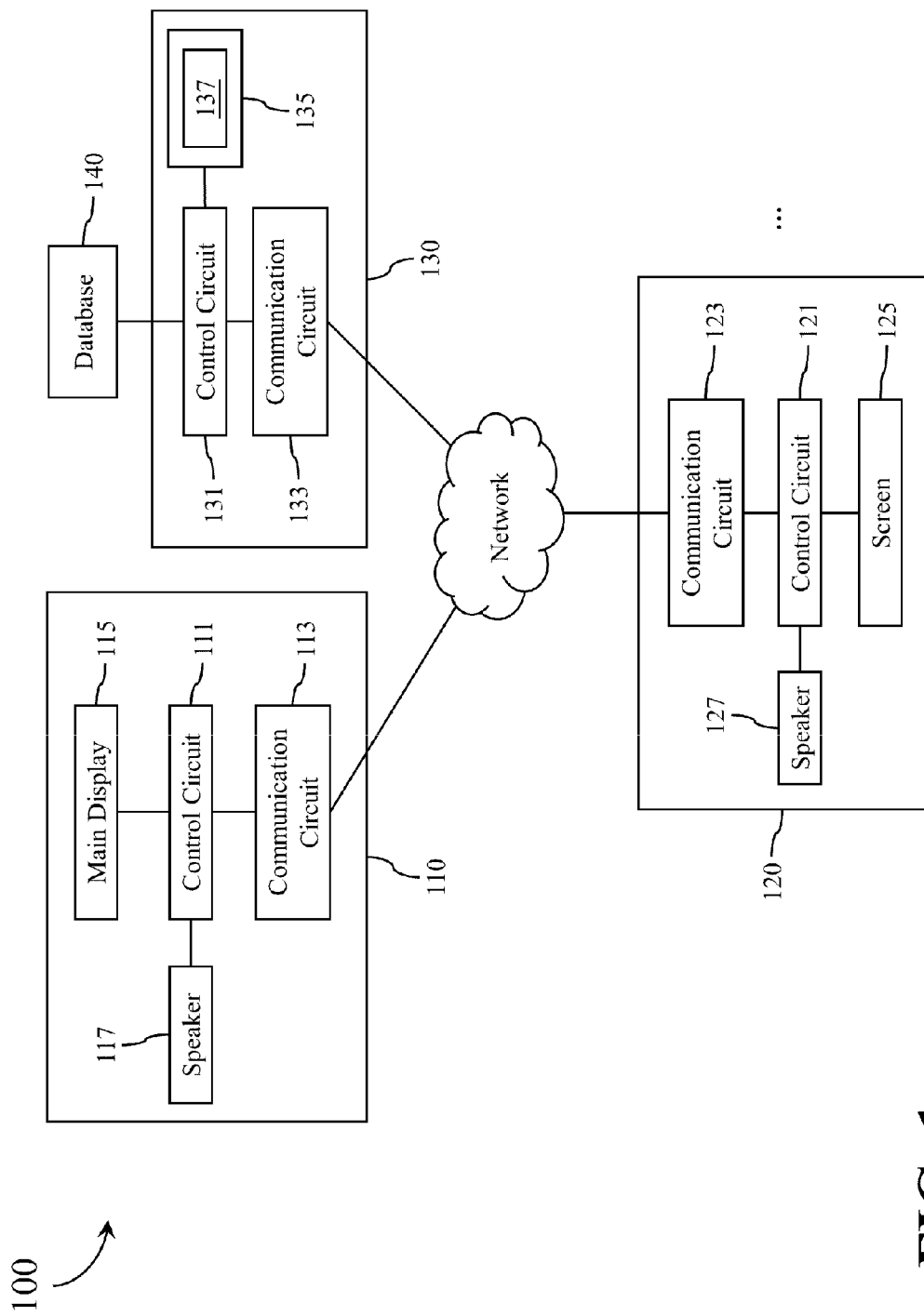
FIG. 1 shows a simplified functional block diagram of a multi-screen video playback system according to one embodiment of the present disclosure.

FIG. 1 shows a simplified functional block diagram of a multi-screen video playback system 100 according to one embodiment of the present disclosure. The multi-screen video playback system 100 comprises a video playback device 110, at least one portable communication device 120, a multi-screen display controlling server 130, and a database 140. In the multi-screen video playback system 100, the video playback device 110 is configured to operably playback a target video to be watched by the user of the portable communication device 120. The portable communication device 120 is configured to operably playback an auxiliary video corresponding to the target video. In this embodiment, the database 140 is configured to operably store the target video, and one or more auxiliary videos corresponding to the target video. The database 140 may be realized with a single database, or may be realized with a combination of multiple databases located in the same geographical area or located in different geographical areas.

In practice, the movie producer or TV producer may prepare additional videos that can be playbacked by the portable communication device 120 for the movie plots of one or more specific points of time in the target video, and store the additional videos in the database 140 as auxiliary videos. That is, for a single predetermined point of time of the target video, one or more corresponding auxiliary videos are available for access. When a predetermined scene of the target video appears while the video playback device 110 playbacks the target video, the multi-screen display controlling server 130 instructs the portable communication device 120 to synchronously playback one of the auxiliary videos corresponding to the predetermined scene. As a result, the video producer is allowed to utilize the portable communication device 120 as a tool to cooperate with the video playback device 110 to jointly create more diversified approaches for presenting the video content so as to enhance the drama effect of the target video.

As shown in FIG. 1, the video playback device 110 comprises a control circuit 111, a communication circuit 113, a main display 115, and a speaker 117. The aforementioned main display 115 may be a screen, a projector, or any other device capable of playbacking videos. Each portable communication device 120 comprises a control circuit 121, a communication circuit 123, a screen 125, and a speaker 127. The multi-screen display controlling server 130 comprises a control circuit 131, a communication circuit 133, and a non-transitory storage device 135, wherein the storage device 135 is stored with a computer program product 137. Each of the control circuits 111, 121, and 131 may be realized with one or more processor units. Each of the communication circuits 113, 123, and 133 may be realized with a wired networking circuit, a wireless networking circuit, or a hybrid circuit integrated with the functionalities of the above wired networking circuit and the wireless networking circuit. In operations, the multi-screen display controlling server 130 may communicate date with the video playback device 110 and the portable communication device 120 via a network.

In the multi-screen video playback system 100, the video playback device 110 may be realized with any device capable of playbacking videos, such as a computer (e.g., a tablet computer, a notebook computer, or a netbook computer), a TV, a mobile phone, an electronic book, a home theater system, or a video and audio playback system in the movie theater. The portable communication device 120 may be realized with any portable electronic device having a screen and capable of connecting to a network. For example, the portable communication device 120 may be a mobile phone, a tablet computer, a notebook computer, a netbook computer, an electronic book, or a handheld game console. The aforementioned network may be the internet or an intranet adopting various communication protocols.

Figure 2:
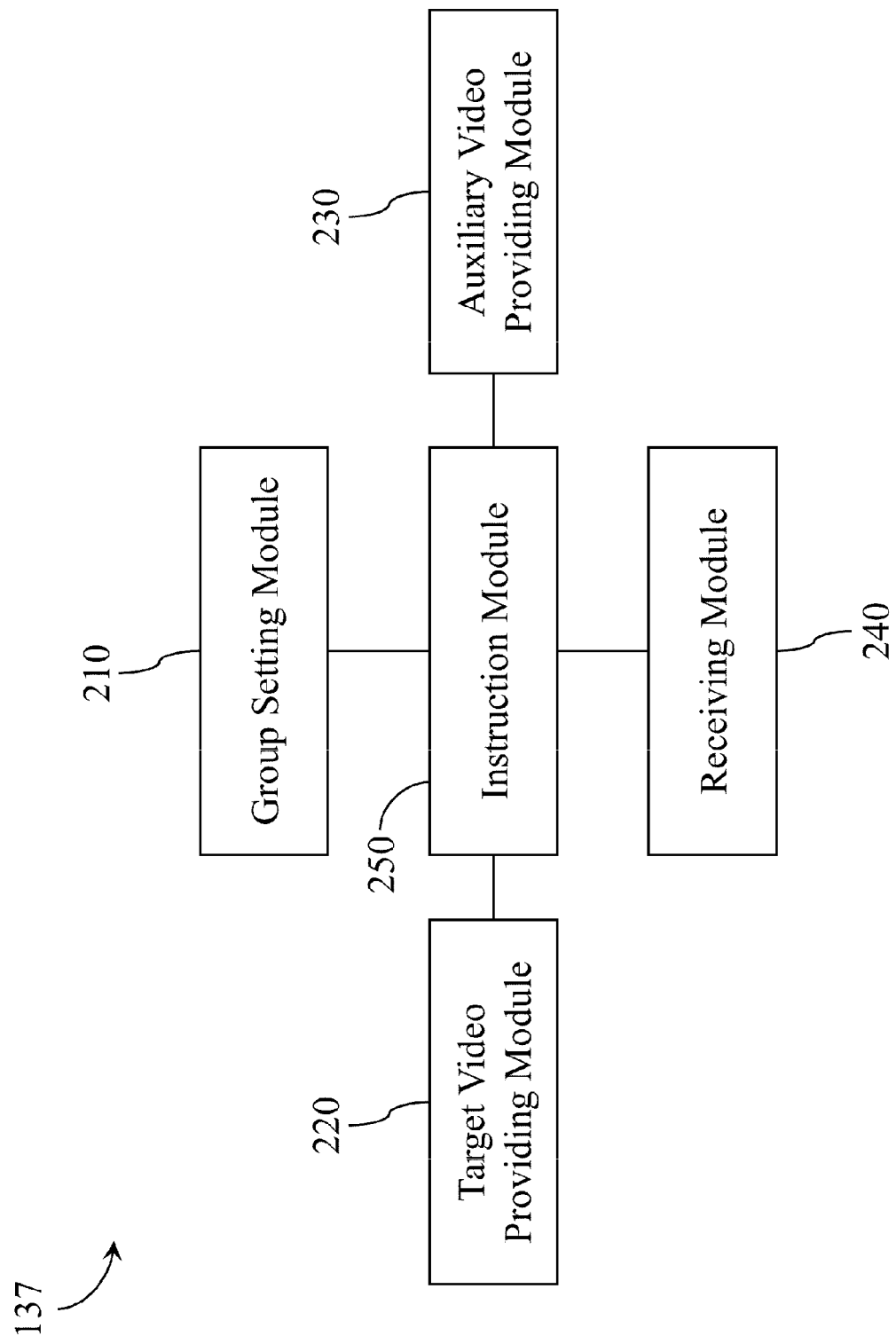
FIG. 2 shows a simplified schematic diagram of functional modules of a computer program product stored in the multi-screen display controlling server in FIG. 1 according to one embodiment of the present disclosure.

The computer program product 137 stored in the multi-screen display controlling server 130 may be realized with one or more application program modules. For example, FIG. 2 shows a simplified schematic diagram of functional modules of the computer program product 137 in FIG. 1 according to one embodiment of the present disclosure. In this embodiment, the computer program product 137 comprises a group setting module 210, a target video providing module 220, an auxiliary video providing module 230, a receiving module 240, and an instruction module 250.

The operations of the multi-screen video playback system 100 will be further described in the following with reference to FIG. 3.

Figure 3:
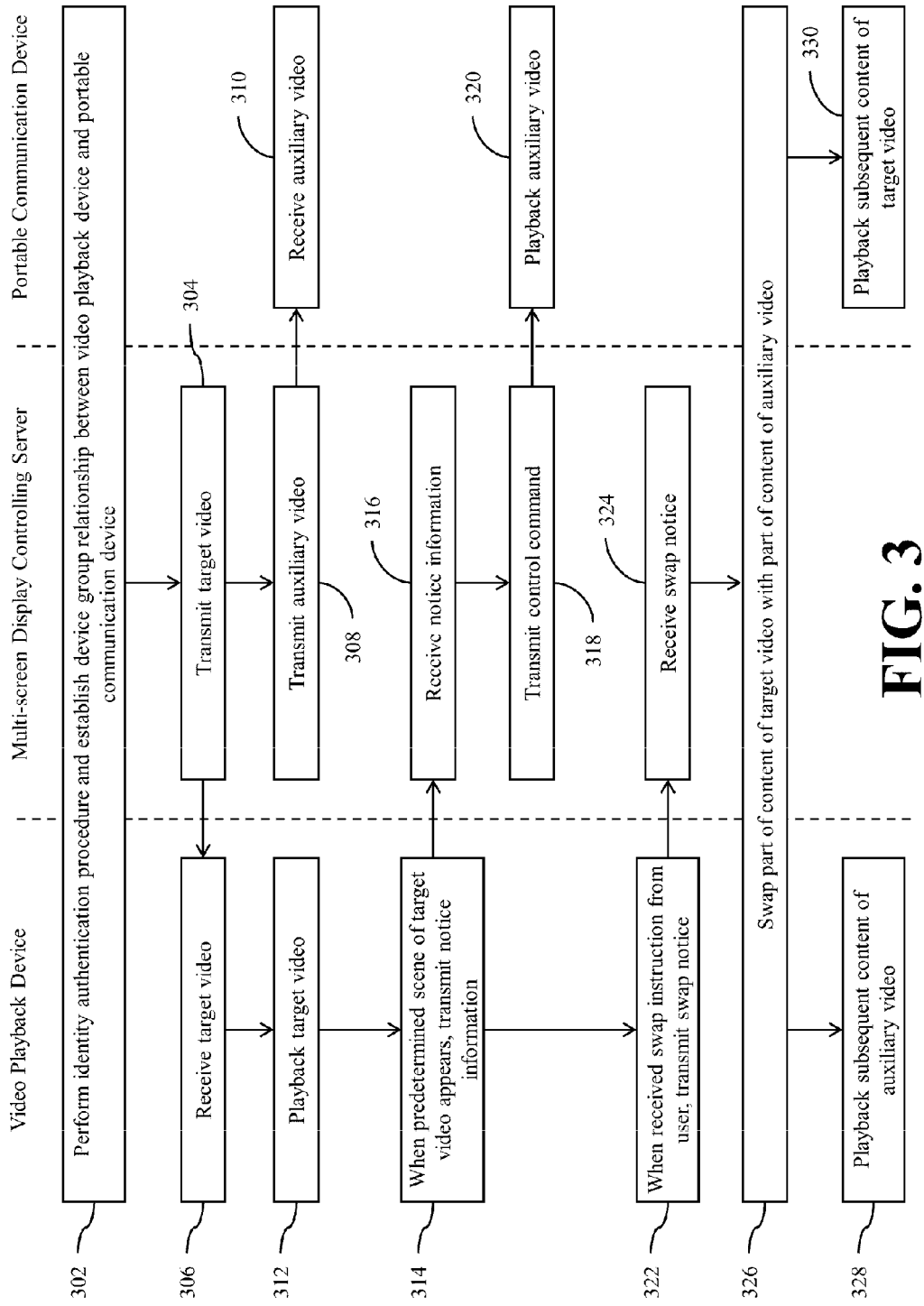
FIG. 3 through FIG. 6 show simplified flowcharts illustrating video playback methods according to several embodiments of the present disclosure.

FIG. 3 shows a simplified flowchart illustrating a video playback method according to one embodiment of the present disclosure. In the flowchart of FIG. 3, operations within a column under the name of a specific device are operations to be performed by the specific device. For example, operations within a column under the label "video playback device" are operations to be performed by the video playback device 110; operations within a column under the label "portable communication device" are operations to be performed by the portable communication device 120; operations within a column under the label "multi-screen display controlling server" are operations to be performed by the multi-screen display controlling server 130; and so forth. The same analogous arrangement also applies to the subsequent flowcharts.

When performing the video playback method of each flowchart in the drawings, the control circuit 131 of the multi-screen display controlling server 130 executes the computer program product 137 to enable the multi-screen display controlling server 130 to perform a multi-screen display controlling operation comprising some or all operations within the corresponding column.

When the user of the portable communication device 120 wants to watch the target video, the video playback device 110 and the portable communication device 120 may be utilized to perform the operation 302 to establish a device group relationship between the video playback device 110 and the portable communication device 120.

In the operation 302, the video playback device 110 utilizes the communication circuit 113 to communicate with the multi-screen display controlling server 130 via a network, and each portable communication device 120 utilizes the communication circuit 123 to communicate with the multi-screen display controlling server 130 via a network. Then, the group setting module 210 of the multi-screen display controlling server 130 conducts an identity authentication procedure to the video playback device 110 and the portable communication device 120, and establishes a device group relationship between the video playback device 110 and the portable communication device 120.

For example, the group setting module 210 may request the user of the video playback device 110 to select or input a specific group ID. When the portable communication device 120 establishes a connection with the multi-screen display controlling server 130, the multi-screen display controlling server 130 may request the user of the portable communication device 120 to select or input a group ID. When the group ID configured by the portable communication device 120 matches with the group ID configured by the video playback device 110, the group setting module 210 sets the video playback device 110 and the portable communication device 120 using the same group ID as the same device group.

In the operation 304, the target video providing module 220 of the multi-screen display controlling server 130 retrieves the target video to be watched by the user of the portable communication device 120 from the database 140, and utilizes the communication circuit 133 to transmit the target video to the video playback device 110 via a network.

In the operation 306, the control circuit 111 of the video playback device 110 utilizes the communication circuit 113 to receive the target video transmitted from the multi-screen display controlling server 130.

In the operation 308, the auxiliary video providing module 230 of the multi-screen display controlling server 130 retrieves one or more auxiliary videos corresponding to the target video from the database 140, and utilizes the communication circuit 133 to transmit the auxiliary videos to the portable communication device 120 via a network.

In the operation 310, the control circuit 121 of the portable communication device 120 utilizes the communication circuit 123 to receive the auxiliary video transmitted from the multi-screen display controlling server 130.

In the operation 312, the control circuit 111 of the video playback device 110 utilizes the main display 115 and the speaker 117 to playback the video and audio content of the target video so that the user of the portable communication device 120 can watch the target video through the video playback device 110.

In the embodiment of FIG. 3, when a predetermined scene of the target video displayed on the main display appears, it means that a specific movie plot of the target video is coming soon. The specific movie plot, for example, may be a dialog between specific characters, may be different events happened in different venues at the same time, or may be the same event expressed from different viewing angles. At this time, the control circuit 111 of the video playback device 110 performs the operation 314 to utilize the communication circuit 113 to transmit a notice information to the multi-screen display controlling server 130. In this embodiment, the notice information may contain a time information (e.g., a time stamp) corresponding to the predetermined scene or an ID code of the corresponding auxiliary video.

In the operation 316, the receiving module 240 of the multi-screen display controlling server 130 utilizes the communication circuit 133 to receive the notice information transmitted from the portable communication device 120.

In the operation 318, the instruction module 250 of the multi-screen display controlling server 130 utilizes the communication circuit 133 to transmit a control command to the portable communication device 120 according to the notice information so as to instruct the portable communication device 120 to begin displaying corresponding auxiliary video of the predetermined scene on the screen 125. In this embodiment, the control command may contain the time information (e.g., the time stamp) corresponding to the predetermined scene or the ID code of the corresponding auxiliary video.

In the operation 320, the control circuit 121 of the portable communication device 120 utilizes the screen 125 to display the auxiliary video and utilizes the speaker 127 to playback related audio content according to the control command transmitted from the multi-screen display controlling server 130. As a result, the screen 125 and the main display 115 simultaneously display different videos.

For example, as to the movie plot of a dialog between specific characters, the producer of the target video may pre-compile image contents of one party into the target video and pre-compile image contents of another party into the auxiliary video. As described previously, when the notice information generated by the portable communication device 120 is received by the receiving module 240 of the multi-screen display controlling server 130, the instruction module 250 controls the portable communication device 120 to begin displaying the auxiliary video on the screen 125 according to the notice information. Accordingly, when the main display 115 displays the image contents of one party, the screen 125 would synchronously displays the image contents of another party. At this situation, the user is allowed to put more focus on the images displayed on the main display 115 or to put more focus on the images displayed on the screen 125 based on his/her preference, thereby obtaining deeper perception for the story line.

For another example, as to the movie plot showing different events happened in different venues at the same time, the producer of the target video may pre-compile image contents of one venue into the target video and pre-compile image contents of another venue into the auxiliary video. Accordingly, when the main display 115 displays the image contents of one venue, the screen 125 would synchronously displays the image contents of another venue. At this situation, the user is allowed to watch the image contents of either venue of interest to obtain different perception for the story line.

For another example, as to the movie plot expressing the same event from different viewing angles (e.g., for a certain scene in a sport game), the producer of the target video may pre-compile image contents of one viewing angle (e.g., the front view) into the target video and pre-compile image contents of another viewing angle (e.g., the bird's eye view) into the auxiliary video. Accordingly, when the main display 115 displays the image contents of one viewing angle, the screen 125 would synchronously displays the image contents of another viewing angle. At this situation, the user is allowed to put more focus on the image contents of either viewing angle of interest to obtain different visual perception.

In practice, the producer of the target video may pre-compile different auxiliary videos for different movie plots of the target video and store the resulting auxiliary videos in the database 140. The lasting time of each auxiliary video may be adjusted depending on the video content and the drama effects to be created, and not restricted to a particular pattern. The aforementioned different auxiliary videos may form a successive story line or may belong to discontinuous movie plots.

In addition, the control circuit 121 of the portable communication device 120 may control the screen 125 to stay in the last image of an auxiliary video when finished displaying the auxiliary video. Alternatively, the control circuit 121 may temporarily turn of the screen 125 when there is no need to display any auxiliary video, so as to reduce the power consumption of the portable communication device 120.

As can be appreciated from the foregoing descriptions, the multi-screen video playback system 100 greatly increases the user's selection flexibility for the video content to watch, and also provides the movie producer or TV producer with more diversified approaches for presenting the video content, thereby enabling the video audience to obtain more rich and more different experience in watching videos. In addition, the movie producer or TV producer is no longer require to split image contents of different perspectives or different viewing angles and to combine split images into the same screen picture, and thus the integrity of image of respective perspective or viewing angle can be effectively improved.

While the multi-screen video playback system 100 playbacks the target video and the auxiliary video, if the user issues an instruction to the video playback device 110 to request for swapping the video currently displayed on the main display 115 with the video currently displayed on the screen 125, the control circuit 111 of the video playback device 110 performs the operation 322.

In the operation 322, the control circuit 111 utilizes the communication circuit 113 to transmit a swap notice to the multi-screen display controlling server 130.

In the operation 324, the receiving module 240 of the multi-screen display controlling server 130 utilizes the communication circuit 133 to receive the swap notice generated by the portable communication device 120 via a network.

When the swap notice is received by the receiving module 240, the video playback device 110, the portable communication device 120, and the multi-screen display controlling server 130 perform the operation 326.

In the operation 326, the instruction module 250 instructs the target video providing module 220 and the auxiliary video providing module 230 to swap subsequent content of the target video to be displayed on the main display 115 with subsequent content of the auxiliary video to be displayed on the screen 125. For example, the target video providing module 220 may retrieve subsequent content of the target video to be displayed on the main display 115 from the database 140, and utilize the communication circuit 133 to transmit the retrieved video to the portable communication device 120 via the network. At the same time, the auxiliary video providing module 230 may retrieve subsequent content of the auxiliary video to be displayed on the screen 125 from the database 140, and utilize the communication circuit 133 to transmit the retrieved video to the video playback device 110 via the network.

Then, the control circuit 111 of the video playback device 110 performs the operation 328 to utilize the main display 115 to successively playback subsequent content of the auxiliary video. Simultaneously, the control circuit 121 of the portable communication device 120 performs the operation 330 to utilize the screen 125 to successively playback subsequent content of the target video.

Through the aforementioned operations 326, 328, and 330, the multi-screen video playback system 100 is enabled to swap the video contents to be displayed on the main display 115 and the screen 125.

Figure 4:
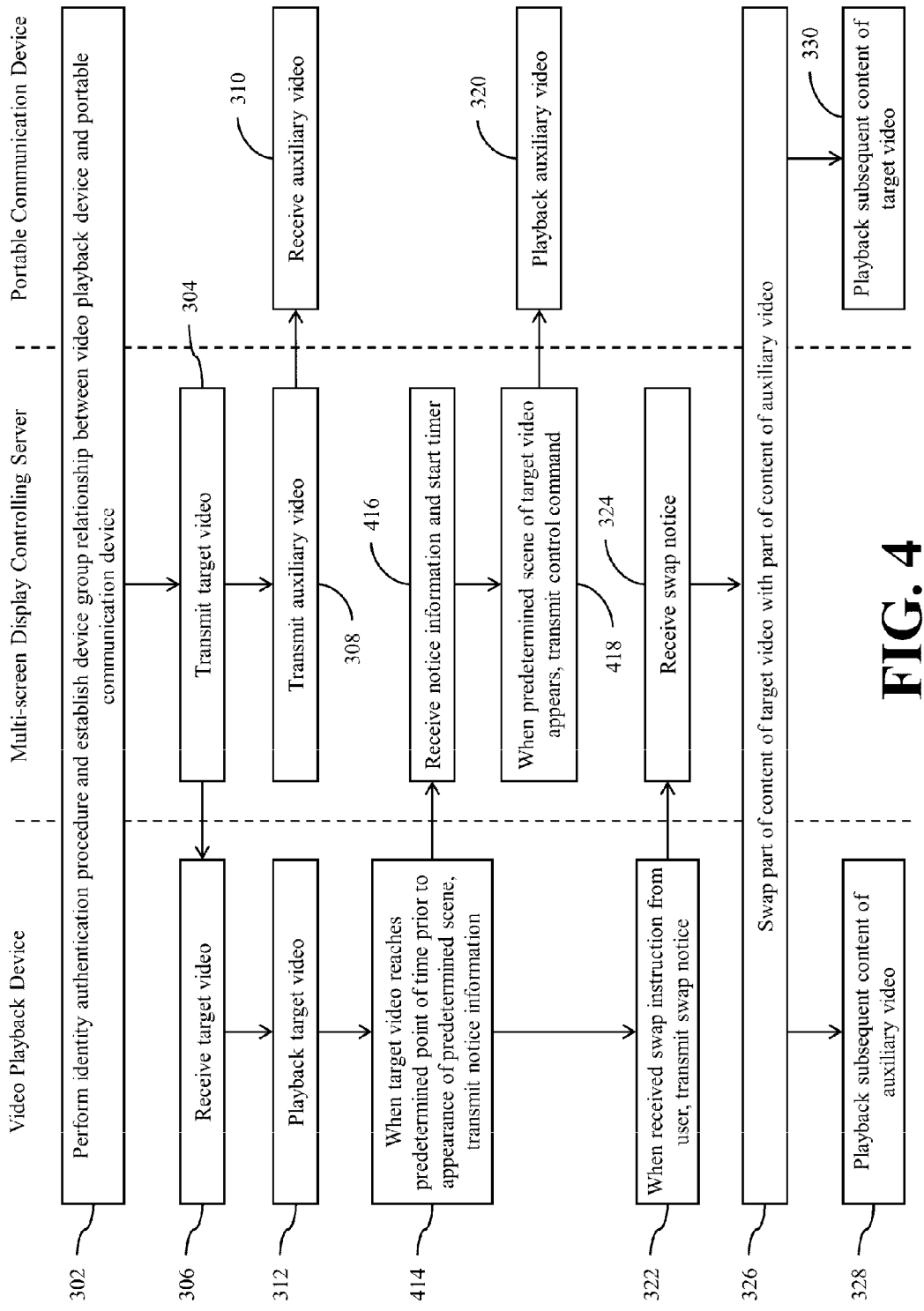

FIG. 4 shows a simplified flowchart illustrating a video playback method according to another embodiment of the present disclosure. As shown in FIG. 4, the control circuit 111 of the video playback device 110 also utilizes the main display 115 and the speaker 117 to playback the video and audio content of the target video in the operation 312.

In the embodiment of FIG. 4, when target video currently displayed on the main display 115 reaches a predetermined point of time prior to the appearance of the aforementioned predetermined scene, the control circuit 111 of the video playback device 110 performs the operation 414 to utilize the communication circuit 113 to transmit a notice information to the multi-screen display controlling server 130. In practice, the predetermined point of time may be the starting point of time of the target video, or may be a pre-negotiated point of time with a fixed time length prior to the specific movie plot. For example, the predetermined point of time may be a time point with 5 seconds or 10 seconds prior to the specific movie plot.

In the operation 416, the receiving module 240 of the multi-screen display controlling server 130 utilizes the communication circuit 133 to receive the notice information transmitted from the portable communication device 120. The producer of the target video may pre-configure a time length of a period between the aforementioned predetermined point of time and the specific movie plot, and store the time length in the multi-screen display controlling server 130. Alternatively, the aforementioned time length may be stored in the database 140 and is accessible by the multi-screen display controlling server 130. Alternatively, the aforementioned time length may be contained in the notice information and directly transmitted to the multi-screen display controlling server 130. In this embodiment, when the receiving module 240 receives the notice information, the instruction module 250 of the multi-screen display controlling server 130 starts a timer.

When the aforementioned scene of the target video displayed on the main display 115 of the video playback device 110 appears, the instruction module 250 performs the operation 418 to utilize the communication circuit 133 to transmit a control command to the portable communication devices 120 to instruct the communication devices 120 to begin displaying auxiliary video corresponding to the predetermined scene. In this embodiment, the instruction module 250 may determine that the predetermined scene of the target video currently displayed on the main display 115 appears after a predetermined period since the notice information is received by the receiving module 240, and then perform the aforementioned operation 418.

The implementations and advantages of other operations in FIG. 4 are the same as the embodiments of FIG. 3. Accordingly, the descriptions regarding the implementations and related advantages for the other operations in FIG. 3 are also applicable to the embodiment of FIG. 4. For simplicity, the descriptions will not be repeated here.

It can be appreciated from the foregoing descriptions of the embodiment of FIG. 4 that at a time point with a fixed period prior to the appearance of a specific movie plot of the target video playbacked by the video playback device 110, the video playback device 110 may transmit a notice information to the multi-screen display controlling server 130 in advance. When the notice information is received by the multi-screen display controlling server 130, the multi-screen display controlling server 130 starts a timer. When the multi-screen display controlling server 130 determines that the specific movie plot is coming based on the timer operation, the multi-screen display controlling server 130 instructs the portable communication device 120 to begin displaying the auxiliary video corresponding to the movie plot of the target video. As a result, the screen 125 cooperates with the main display 115 to simultaneously display different video contents.

Figure 5:
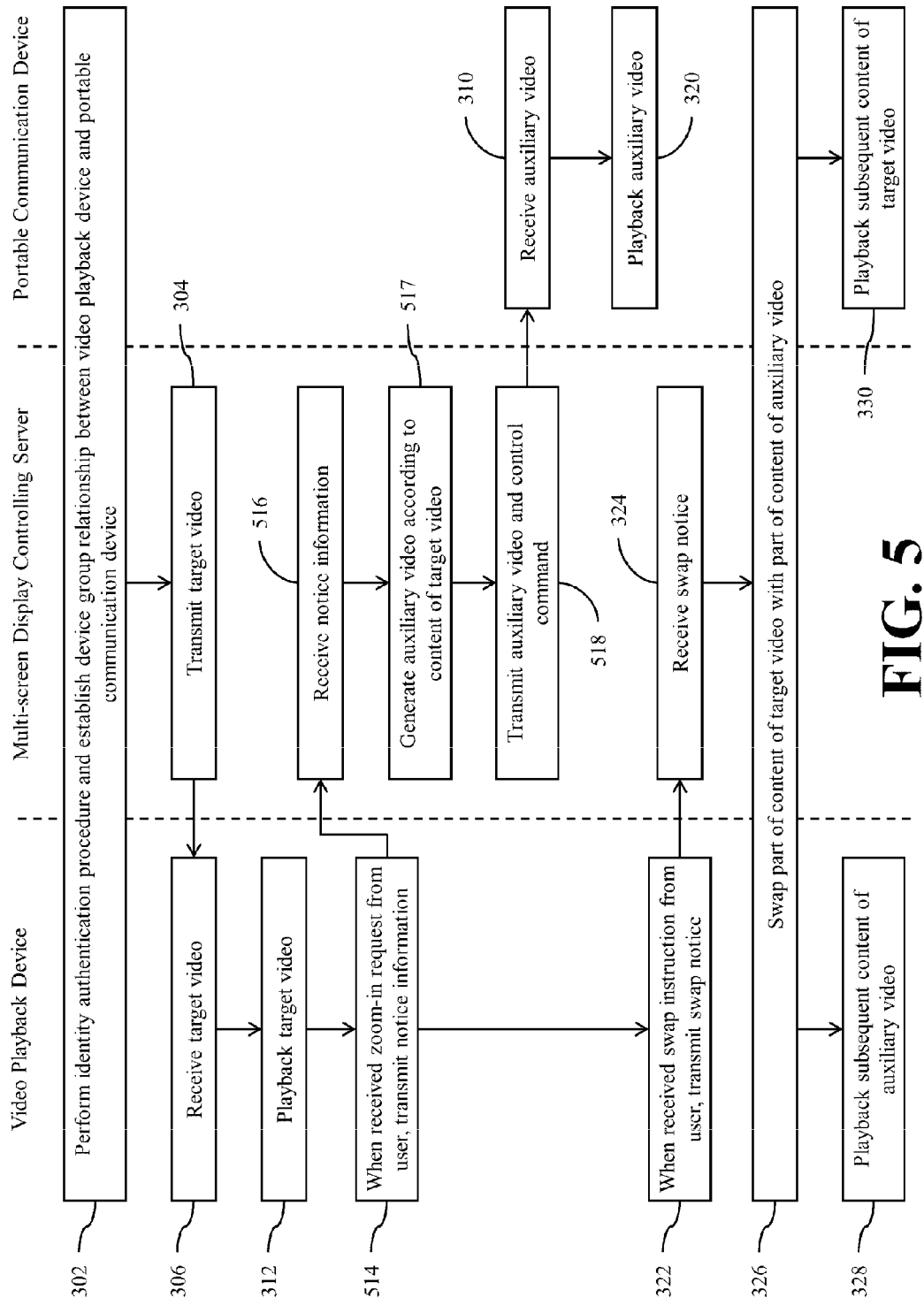

FIG. 5 shows a simplified flowchart illustrating a video playback method according to another embodiment of the present disclosure. As shown in FIG. 5, the control circuit 111 of the video playback device 110 also utilizes the main display 115 and the speaker 117 to playback the video and audio content of the target video in the operation 312.

While the video playback device 110 playbacks the target video, once the user issues a zoom-in (enlarge) request to the video playback device 110 to request for enlarging a partial image region of the target video currently displayed on the main display 115, the control circuit 111 of the video playback device 110 performs the operation 514.

In the operation 514, the control circuit 111 utilizes the communication circuit 113 to transmit a notice information to the multi-screen display controlling server 130. In this embodiment, the notice information may contain information related to the position of the aforementioned partial image region, such as the coordinates or size of the image region or the like.

In the operation 516, the receiving module 240 of the multi-screen display controlling server 130 utilizes the communication circuit 133 to receive the notice information generated by the portable communication device 120 in the operation 514 via a network.

When the receiving module 240 received the notice information, the auxiliary video providing module 230 performs the operation 517.

In the operation 517, the auxiliary video providing module 230 generates an auxiliary video according to the content of the target video. For example, the auxiliary video providing module 230 may utilize the control circuit 131 of the multi-screen display controlling server 130 to enlarge the partial image region of the target video according to the notice information, and utilize the resulting enlarged images as the auxiliary video.

In the operation 518, the instruction module 250 of the multi-screen display controlling server 130 utilizes the communication circuit 133 to transmit a control command and the auxiliary video generated by the auxiliary video providing module 230 to the portable communication device 120, so as to instruct the portable communication device 120 to display the auxiliary video on the screen 125.

For illustrative purpose, it is assumed herein that the target video is related to a specific sport game, for example, a ball game. When the user requests the video playback device 110 to enlarge a partial image region of the target video currently displayed on the main display 115, the video playback device 110 transmits the notice information to the multi-screen display controlling server 130. When the receiving module 240 received the notice information, the auxiliary video providing module 230 dynamically generates a corresponding auxiliary video based on the content of the target video, and transmits the resulting auxiliary video to the portable communication device 120. The portable communication device 120 utilizes the screen 125 to playback the auxiliary video to present the zoomed in version (i.e., the enlarged version) of the partial image region of the target video. As a result, the user is allowed to watch the zoomed in version of the partial image region of the target video from the screen 125 while the main display 115 displays the target video, and is thus capable of viewing the partial image region of the target video in more details.

The implementations and advantages of other operations in FIG. 5 are the same as the embodiments of FIG. 3. Accordingly, the descriptions regarding the implementations and related advantages for the other operations in FIG. 3 are also applicable to the embodiment of FIG. 5. For simplicity, the descriptions will not be repeated here.

It can be appreciated from the foregoing descriptions of the embodiment of FIG. 5 that when the user request the video playback device 110 to zoom-in a partial image region of the target video currently displayed on the main display 115, the multi-screen display controlling server 130 dynamically generates a corresponding auxiliary video corresponding to the content of the target video according to the notice information generated by the video playback device 110, and controls the portable communication device 120 to display the auxiliary video on the screen 125 to present the zoomed in version of the partial image region of the target video.

In practice, the movie producer or TV producer may employ multiple cameras to capture images from different viewing angles to produce videos of different viewing angles. The movie producer or TV producer may utilize the video of one of the viewing angles as the target video and utilizes the videos of the other viewing angles as multiple auxiliary videos. The target video and the multiple auxiliary videos may be stored in the database 140, so that the multi-screen display controlling server 130 is enabled to change the viewing angle of the auxiliary video to be displayed on the screen 125 according to the user's instruction.

Figure 6:
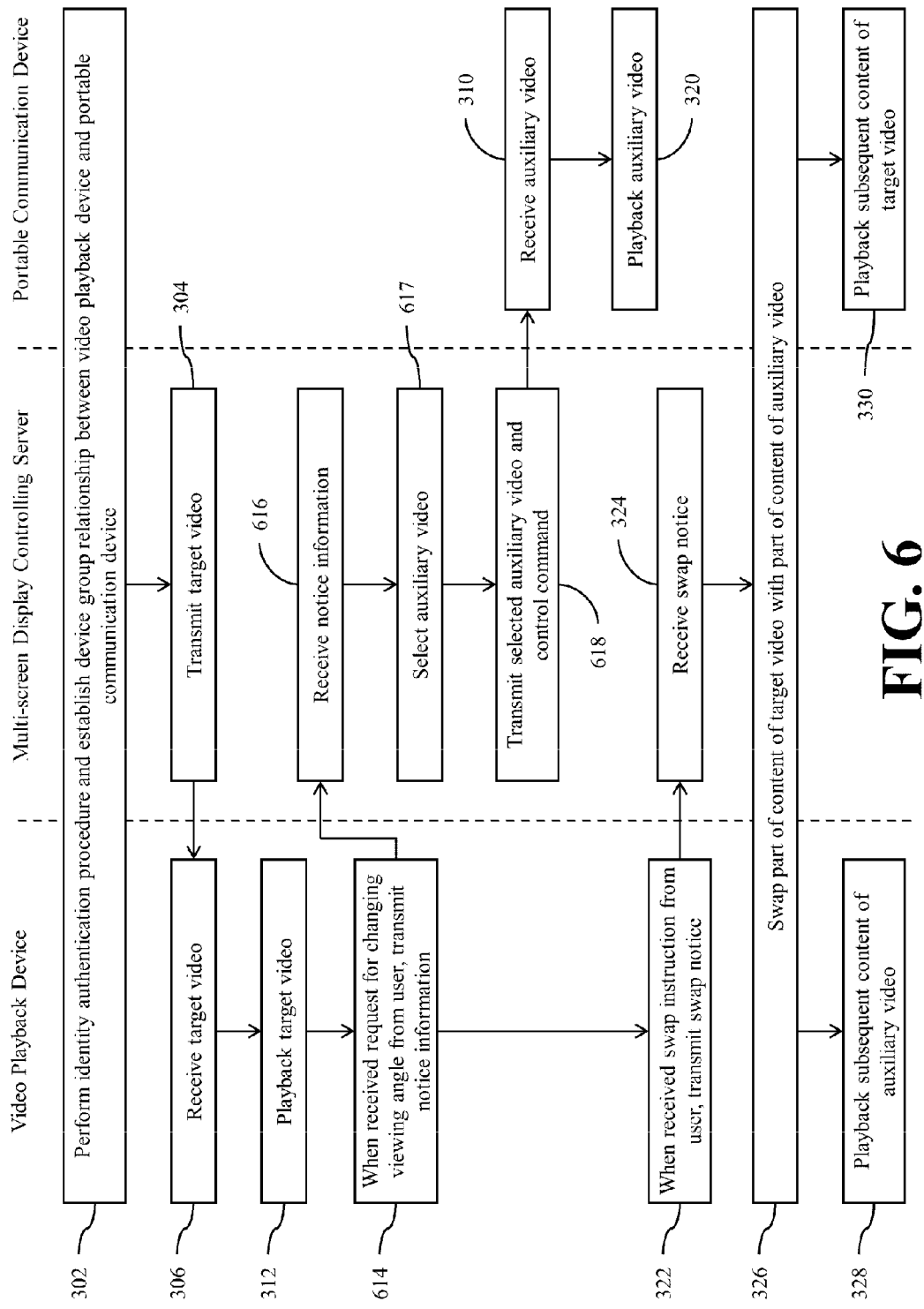

For example, FIG. 6 shows a simplified flowchart illustrating a video playback method according to another embodiment of the present disclosure. As shown in FIG. 6, the control circuit 111 of the video playback device 110 also utilizes the main display 115 and the speaker 117 to playback the video and audio content of the target video in the operation 312.

While the main display 115 displays the target video, once the user issues an instruction to the video playback device 110 to request for changing viewing angle of the target video currently displayed on the main display 115, the control circuit 111 of the video playback device 110 performs the operation 614.

In the operation 614, the control circuit 111 utilizes the communication circuit 113 to transmit a notice information to the multi-screen display controlling server 130. In this embodiment, the notice information may contain information related to the selected viewing angle, such as the degrees of the viewing angle or an ID code of the viewing angle.

In the operation 616, the receiving module 240 of the multi-screen display controlling server 130 utilizes the communication circuit 133 to receive the notice information generated by the portable communication device 120 in the operation 614 via a network.

When the receiving module 240 received the notice information, the auxiliary video providing module 230 performs the operation 617.

In the operation 617, the auxiliary video providing module 230 selects an auxiliary video corresponding to the selected viewing angle according to the notice information.

In the operation 618, the instruction module 250 of the multi-screen display controlling server 130 utilizes the communication circuit 133 to transmit a control command and the selected auxiliary video to the portable communication device 120, to instruct the portable communication device 120 to utilize the screen 125 to playback the auxiliary video.

For illustrative purpose, it is assumed herein that the target video is related to a specific sport game, for example, a ball game. When the user requests the video playback device 110 to change the viewing angle of the target video currently displayed on the main display 115, the video playback device 110 transmits the notice information to the multi-screen display controlling server 130. When the receiving module 240 received the notice information, the auxiliary video providing module 230 selects a corresponding auxiliary video from the database 140, and transmits the selected auxiliary video to the portable communication device 120. The portable communication device 120 utilizes the screen 125 to playback the auxiliary video to present a video of a different viewing angle compared to the target video. As a result, the user is allowed to watch the images of different viewing angle from the screen 125 while the main display 115 playbacks the target video, and is thus capable of viewing more rich details of the video.

The implementations and advantages of other operations in FIG. 6 are the same as the embodiments of FIG. 3. Accordingly, the descriptions regarding the implementations and related advantages for the other operations in FIG. 3 are also applicable to the embodiment of FIG. 6. For simplicity, the descriptions will not be repeated here.

As can be appreciated from the foregoing descriptions of the embodiment of FIG. 6 that when the user request the video playback device 110 to change the viewing angle of the target video currently displayed on the main display 115, the multi-screen display controlling server 130 real time selects an auxiliary video of corresponding viewing angle according to the notice information generated by the video playback device 110, and controls the portable communication device 120 to utilize the screen 125 to display the auxiliary video. As a result, the screen 125 cooperates with and the main display 115 to simultaneously display videos corresponding to different viewing angles.

In the embodiment of FIG. 6, the multi-screen display controlling server 130 may perform the operation 308 of FIG. 3 after the operation 304 to transmit an auxiliary video of a predetermined viewing angle to the portable communication device 120, and instructs the portable communication device 120 to utilize the screen 125 to simultaneously display the auxiliary video while the main display 115 displays the target video.

The executing order of the operations of each of the aforementioned flowcharts is merely an example, rather than a restriction to the practical implementations. For example, in each of the aforementioned flowcharts, the operation 308 may be performed simultaneously with the operation 304 or the operation 312.

Additionally, some portable communication devices 120 may be provided with additional sensation effect generating devices, such as a vibrator, a luminance device (e.g., a LED device), and an odor storage device. The structure of proposed multi-screen video playback system 100 is also capable of supporting the video producer or director to utilize these additional sensation effect generating devices to create more drama effects. For example, while the main display 115 of the video playback device 110 displays the aforementioned target video or auxiliary video, the instruction module 250 of the multi-screen display controlling server 130 may instruct the portable communication device 120 to utilize the vibrator to vibrate at a predetermined mode, to utilize the luminance device to illuminate in a predetermined pattern, to utilize the odor storage device to release a predetermined odor, or to perform at least one of the above operations. The operations of the additional sensation effect generating devices may create drama effects related to the video content displayed on the main display 115 to enhance the user's perception of the drama effect of the video content.

In addition, while the screen 125 of the portable communication device 120 displays the aforementioned auxiliary video or target video, the instruction module 250 of the multi-screen display controlling server 130 may instruct the portable communication device 120 to utilize the vibrator to vibrate at a predetermined mode, to utilize the luminance device to illuminate in a predetermined pattern, to utilize the odor storage device to release a predetermined odor, or to perform at least one of the above operations. The operations of the additional sensation effect generating devices may create drama effects related to the video content displayed on the screen 125 to enhance the user's perception of the drama effect of the video content.

It can be appreciated from the foregoing descriptions that the proposed multi-screen video playback system 100 enable the video producer or director to utilize the popular portable communication device 120 to simultaneously playback an auxiliary video corresponding to the target video, and thus the way for presenting the video content is no longer restricted to the single main display 115. As a result, while the main display 115 displays the target video, the user is enabled to watch images of different viewing angle, video of different story line, or a scaled version of a partial image region of the target video from the screen 125 of the portable communication device 120. Accordingly, the multi-screen video playback system 100 greatly increases the selection flexibility and entertainment of the video content to watch, thereby providing more rich and more different experience in watching videos.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-screen video playback system, comprising:
    a video playback device, comprising a main display configured to operably display a target video;
    a portable communication device, comprising a screen; and
    a multi-screen display controlling server, configured to operably conduct an identity authentication procedure to the video playback device and the portable communication device to establish a device group relationship between the video playback device and the portable communication device, to operably transmit the target video to the video playback device via a network, and to operably transmit an auxiliary video to the portable communication device via a network;
    wherein the multi-screen display controlling server receives a notice information, corresponding to a predetermined scene of the target video and generated by the video playback device, while the video playback device playbacks the target video, and instructs the portable communication device to begin displaying the auxiliary video on the screen according to the notice information, so that the portable communication device displays the auxiliary video but not the target video while the main display displays the target video.

2. The multi-screen video playback system of claim 1, wherein the video playback device generates the notice information when the predetermined scene of the target video displayed on the main display appears, and when the notice information is received by the multi-screen display controlling server, the multi-screen display controlling server instructs the portable communication device to begin displaying the auxiliary video on the screen according to the notice information.

3. The multi-screen video playback system of claim 2, wherein when a swap notice, which is generated by the video playback device while the video playback device playbacks the target video, is received by the multi-screen display controlling server, the multi-screen display controlling server swaps subsequent content of the target video to be displayed on the main display with subsequent content of the auxiliary video to be displayed on the screen.

4. The multi-screen video playback system of claim 1, wherein when the target video displayed on the main display reaches a predetermined point of time prior to the predetermined scene, the video playback device generates the notice information, and after a predetermined period since the notice information is received by the multi-screen display controlling server, the multi-screen display controlling server instructs the portable communication device to begin displaying the auxiliary video on the screen according to the notice information.

5. The multi-screen video playback system of claim 4, wherein when a swap notice, which is generated by the video playback device while the video playback device playbacks the target video, is received by the multi-screen display controlling server, the multi-screen display controlling server swaps subsequent content of the target video to be displayed on the main display with subsequent content of the auxiliary video to be displayed on the screen.

6. The multi-screen video playback system of claim 1, wherein when a swap notice, which is generated by the video playback device while the video playback device playbacks the target video, is received by the multi-screen display controlling server, the multi-screen display controlling server swaps subsequent content of the target video to be displayed on the main display with subsequent content of the auxiliary video to be displayed on the screen.

7. The multi-screen video playback system of claim 1, wherein when the notice information is received by the multi-screen display controlling server, the multi-screen display controlling server begins to transmit the auxiliary video to the portable communication device via the network, and the target video and the auxiliary video respectively correspond to different viewing angles.

8. The multi-screen video playback system of claim 7, wherein when a swap notice, which is generated by the video playback device while the video playback device playbacks the target video, is received by the multi-screen display controlling server, the multi-screen display controlling server swaps subsequent content of the target video to be displayed on the main display with subsequent content of the auxiliary video to be displayed on the screen.

9. The multi-screen video playback system of claim 1, wherein the portable communication device further comprises at least one of a vibrator, a luminance device, and an odor storage device, and while the target video is displayed on the main display, the multi-screen display controlling server instructs the portable communication device to perform at least one of the following operations:
utilizing the vibrator to vibrate at a predetermined mode;
utilizing the luminance device to illuminate in a predetermined pattern; and
utilizing the odor storage device to release a predetermined odor.

10. A computer program product, stored in a non-transitory storage device of a multi-screen display controlling server, when executed by a control circuit of the multi-screen display controlling server, enabling the multi-screen display controlling server to perform a multi-screen display controlling operation, the computer program product comprising:
a group setting module, configured to operably conduct an identity authentication procedure to the video playback device and the portable communication device to establish a device group relationship between a video playback device and a portable communication device, wherein the video playback device comprises a main display, and the portable communication device comprises a screen;
a target video providing module, configured to operably transmit a target video to the video playback device via a network, so that the video playback device displays the target video on the main display;
an auxiliary video providing module, configured to operably transmit an auxiliary video to the portable communication device via a network;
a receiving module, configured to operably receive a notice information, corresponding to a predetermined scene of the target video and generated by the video playback device while the video playback device playbacks the target video; and
an instruction module, configured to operably instruct the portable communication device to begin displaying the auxiliary video on the screen according to the notice information, so that the portable communication device displays the auxiliary video but not the target video while the main display displays the target video.

11. The computer program product of claim 10, wherein the receiving module receives the notice information when the predetermined scene of the target video displayed on the main display appears, and when the notice information is received by the receiving module, the instruction module instructs the portable communication device to begin displaying the auxiliary video on the screen according to the notice information.

12. The computer program product of claim 11, wherein when a swap notice, which is generated by the video playback device while the video playback device playbacks the target video, is received by the receiving module via a network, the instruction module instructs the target video providing module and the auxiliary video providing module to swap subsequent content of the target video to be displayed on the main display with subsequent content of the auxiliary video to be displayed on the screen.

13. The computer program product of claim 10, wherein the receiving module receives the notice information when the target video displayed on the main display reaches the predetermined point of time prior to appearance of a predetermined scene, and after a predetermined period since the notice information is received by the receiving module, the instruction module instructs the portable communication device to begin displaying the auxiliary video on the screen according to the notice information.

14. The computer program product of claim 13, wherein when a swap notice, which is generated by the video playback device while the video playback device playbacks the target video, is received by the receiving module via a network, the instruction module instructs the target video providing module and the auxiliary video providing module to swap subsequent content of the target video to be displayed on the main display with subsequent content of the auxiliary video to be displayed on the screen.

15. The computer program product of claim 10, wherein when a swap notice, which is generated by the video playback device while the video playback device playbacks the target video, is received by the receiving module via a network, the instruction module instructs the target video providing module and the auxiliary video providing module to swap subsequent content of the target video to be displayed on the main display with subsequent content of the auxiliary video to be displayed on the screen.

16. The computer program product of claim 10, wherein when the notice information is received by the receiving module, the instruction module instructs the auxiliary video providing module to begin transmitting the auxiliary video to the portable communication device via the network, and the target video and the auxiliary video respectively correspond to different viewing angles.

17. The computer program product of claim 16, wherein when a swap notice, which is generated by the video playback device while the video playback device playbacks the target video, is received by the receiving module via a network, the instruction module instructs the target video providing module and the auxiliary video providing module to swap subsequent content of the target video to be displayed on the main display with subsequent content of the auxiliary video to be displayed on the screen.

18. The computer program product of claim 10, wherein the portable communication device further comprises at least one of a vibrator, a luminance device, and an odor storage device, and while the target video is displayed on the main display, the instruction module instructs the portable communication device to perform at least one of the following operations:

utilizing the vibrator to vibrate at a predetermined mode;
utilizing the luminance device to illuminate in a predetermined pattern; and
utilizing the odor storage device to release a predetermined odor.

* * * * *